United States Patent
Ruetz

(10) Patent No.: US 6,935,021 B2
(45) Date of Patent: Aug. 30, 2005

(54) METHOD FOR THE PLASTIC MOLDING OF THE HUB RECESS FOR FAST RUNNING TURBINE COMPONENT

(75) Inventor: Georg Ruetz, Immenstaad (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 10/363,428
(22) PCT Filed: Aug. 30, 2001
(86) PCT No.: PCT/EP01/09987
§ 371 (c)(1), (2), (4) Date: Feb. 28, 2003
(87) PCT Pub. No.: WO02/18092
PCT Pub. Date: Mar. 7, 2002

(65) Prior Publication Data
US 2003/0177800 A1 Sep. 25, 2003

(30) Foreign Application Priority Data
Aug. 31, 2000 (DE) .................................. 100 42 700

(51) Int. Cl.$^7$ ..................... B23P 15/04; B21K 25/00
(52) U.S. Cl. ................... 29/889.23; 29/889.2; 29/889; 29/421.1; 29/889.6
(58) Field of Search ................. 29/889, 889.2, 29/889.23, 889.6, 421.1, 446, 90.01, 90.6; 72/54, 56, 58, 61; 164/35, 45, 113; 416/241 A, 234, 204 A, 244 A

(56) References Cited

U.S. PATENT DOCUMENTS

| 4,254,540 | A | * | 3/1981 | Bilak | 29/893.36 |
| 4,396,445 | A | * | 8/1983 | Sasaki et al. | 416/241 B |
| 4,571,969 | A | * | 2/1986 | Tomita | 72/56 |
| 4,938,089 | A | * | 7/1990 | Ohoka | 74/339 |
| 5,802,899 | A | | 9/1998 | Klaas et al. | 72/58 |
| 6,019,927 | A | * | 2/2000 | Galliger | 164/35 |
| 6,029,347 | A | * | 2/2000 | Maumus et al. | 29/889.23 |
| 6,238,187 | B1 | * | 5/2001 | Dulaney et al. | 416/241 R |
| 6,301,766 | B1 | * | 10/2001 | Kolle | 29/421.1 |
| 2001/0001165 | A1 | * | 5/2001 | Hasegawa | 29/34 R |

FOREIGN PATENT DOCUMENTS

| EP | 0 086 505 A1 | 1/1983 | |
| EP | 0 509 238 A1 | 10/1992 | |
| JP | 63131802 A | * 6/1988 | 416/198 R |
| JP | 03025361 A | * 2/1991 | |
| JP | 4-325701 | 11/1992 | |

OTHER PUBLICATIONS

International Search Report.

* cited by examiner

Primary Examiner—Marc Jimenez
(74) Attorney, Agent, or Firm—Crowell & Moring LLP

(57) ABSTRACT

A method for plastic molding of a hub recess for a fast-running turbine component is provided. The plastic molding of the hub recess occurs by hydraulic expansion, by way of a hydraulic fluid introduced into the hub recess of the turbine component under high pressure.

7 Claims, 2 Drawing Sheets

METHOD FOR THE PLASTIC MOLDING OF THE HUB RECESS FOR FAST RUNNING TURBINE COMPONENT

BACKGROUND AND SUMMARY OF THE INVENTION

The invention relates to a method of plastically deforming a hub bore of a fast-running turbine component.

From European Patent Document EP 086 505 A1, a method is known which is used for preventing an expansion of the hub bore of a part, which expansion is caused during an overspeed test of turbine parts as a result of a plastic flowing of the material of the turbine part in the area of the hub, in that the hub bore is plastically deformed prior to the overspeed test. Here, the plastic deformation takes place mechanically by means of a drawing mandrel, a pressing mandrel or a roller and leads to an expansion of the hub bore, which results in a state of tension of the material in the area of the hub bore which virtually anticipates the stressing during the overspeed test.

From German Patent Document DE 43 37 517 A1, a method for the internal high-pressure metal forming of hollow offset shafts made of a cold-formable material is known; during which a tube-shaped starting material, in a tool with an inner contour corresponding to the desired final outer shape of the shaft, is expanded by means of a fluid, which may be a gas or a liquid; by applying a still higher sizing pressure, the expanded workpiece is then sized to the inner contour of the tool; and finally, while maintaining the sizing pressure, is then upset in the longitudinal direction to its final shape. In the case of this known method, a plastic deformation therefore takes place of a relatively thin-walled material to a final outer contour which is significantly different from the original contour of the tube-shaped starting material, in order to produce, for example, drive shafts of a motor vehicle which have a larger outside diameter with a thinner wall thickness in a central tube area and have a smaller outside diameter and a thicker wall thickness at end areas constructed on both sides. In particular, differences in wall thicknesses are to be achieved in the case of such shafts which many times exceed former process limits known in such internal high-pressure metal forming.

Furthermore, a hollow shaft is known from European Patent Document EP 0 509 238 A1 on which parts are fastened by hydraulic expansion. These parts have a central bore whose diameter is slightly larger in the starting condition than the outside diameter of the hollow shaft, so that the parts can be brought into the desired position on the hollow shaft before the hydraulic expansion operation takes place. As a result of the hydraulic expansion of the hollow. shaft, restoring forces are generated which result in a force-locking connection between the fitted-on parts and the hollow shaft.

Finally, from German Patent Document DE 213 421, a process is known for removing machine components disposed on axles or shafts, for example, for pulling off belt pulleys or rope pulleys, flywheels, turbine wheels or the like from their axles, during which a suitable liquid is pressed at a very high pressure on the interior surface of the hub disposed on the shaft. The pressure liquid fed by way of a bore provided in the hub seeks to expand the hub and press it away from the shaft, simultaneously the liquid subjected to a high pressure penetrating into the fitting surfaces between the hub and the shaft, and as a result, having the purpose of facilitating the removal of the machine component to be detached.

It is an object of the invention to increase the ceiling speed of a fast-running turbine component.

This object is achieved in that the plastic deformation of the hub bore takes place by hydraulic expansion by way of a hydraulic fluid fed at a high pressure into the hub bore of the turbine component.

Advantageous further developments of the invention are characterized in the subclaims.

By way of the invention, a method is provided for increasing the ceiling speed of a fast-running turbine component, in the case of which the hub bore of the turbine component is subjected to a plastic deformation. According to the invention, it is provided that the plastic deformation of the hub bore takes place by a hydraulic expansion by way of a hydraulic fluid fed at high pressure into the hub bore of the turbine component.

Preferably, it is provided that the hydraulic expansion of the hub bore takes place by way of a hydraulic device inserted into the latter, which makes it possible that a recess provided between the hub bore and the hydraulic device and sealed off toward the outside by sealing devices can be acted upon under pressure by the hydraulic fluid.

According to an embodiment, it may be provided that the sealing devices act in the radial direction between the hydraulic device and the hub bore.

According to another embodiment, it may be provided that the sealing devices act in the axial direction between the hydraulic device and the hub bore.

It is particularly advantageous to further develop the method according to the invention such that the hydraulic expansion of the hub bore takes place during a balancing step in the production of the turbine component, during which the turbine component is mounted on a balancing mandrel constructed as a hydraulic device.

The method according to the invention is particularly suitable when the turbine component is a compressor impeller of a turbine.

In the case of a turbine component produced from a forged unmachined part, the hydraulic expansion of the hub bore can take place before or after the milling of the blade channels.

In the following, an embodiment of the invention will be explained by the drawings.

DETAILED DESCRIPTION OF THE DRAWINGS

Figure 1:
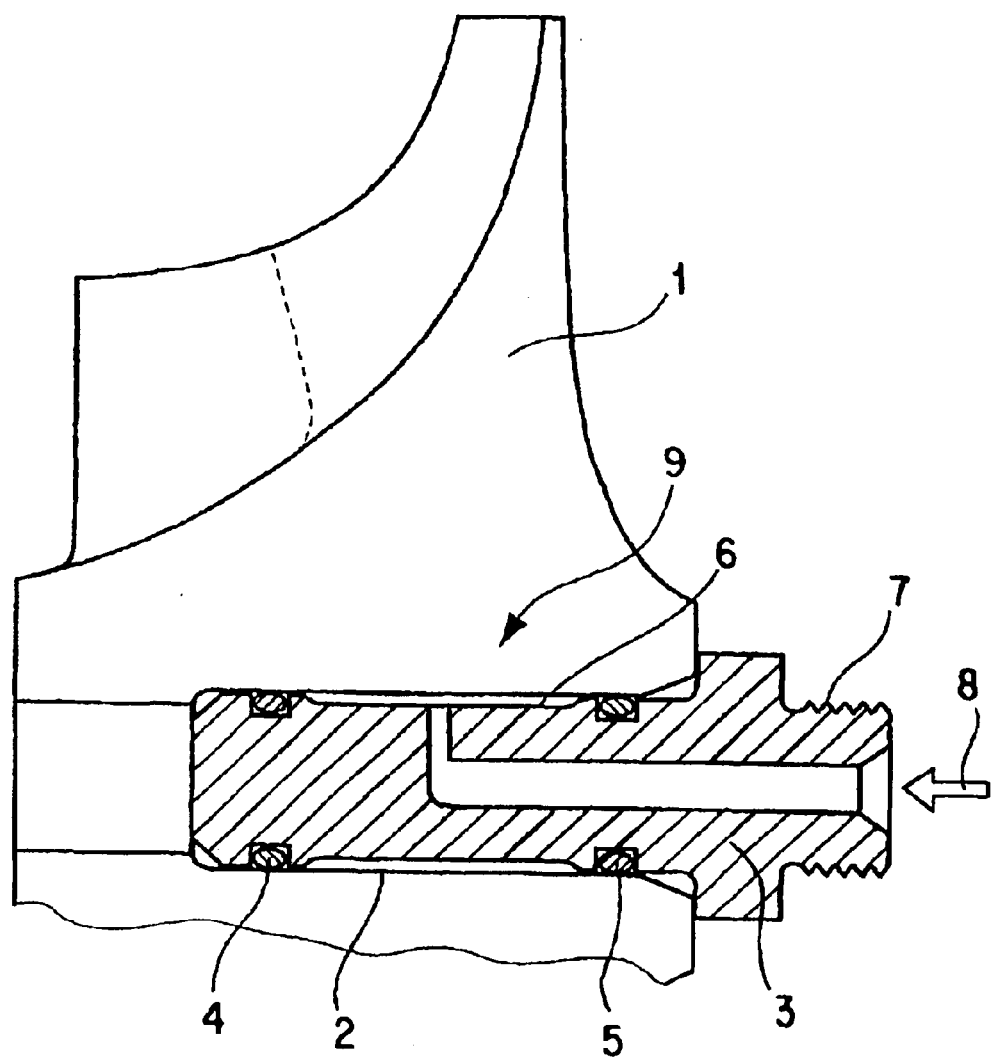
FIG. 1 shows a slightly schematic lateral sectional view of a turbine component in the area of its hub, in the case of which the method according to the invention is applied corresponding to an embodiment of the invention.
Figure 2:
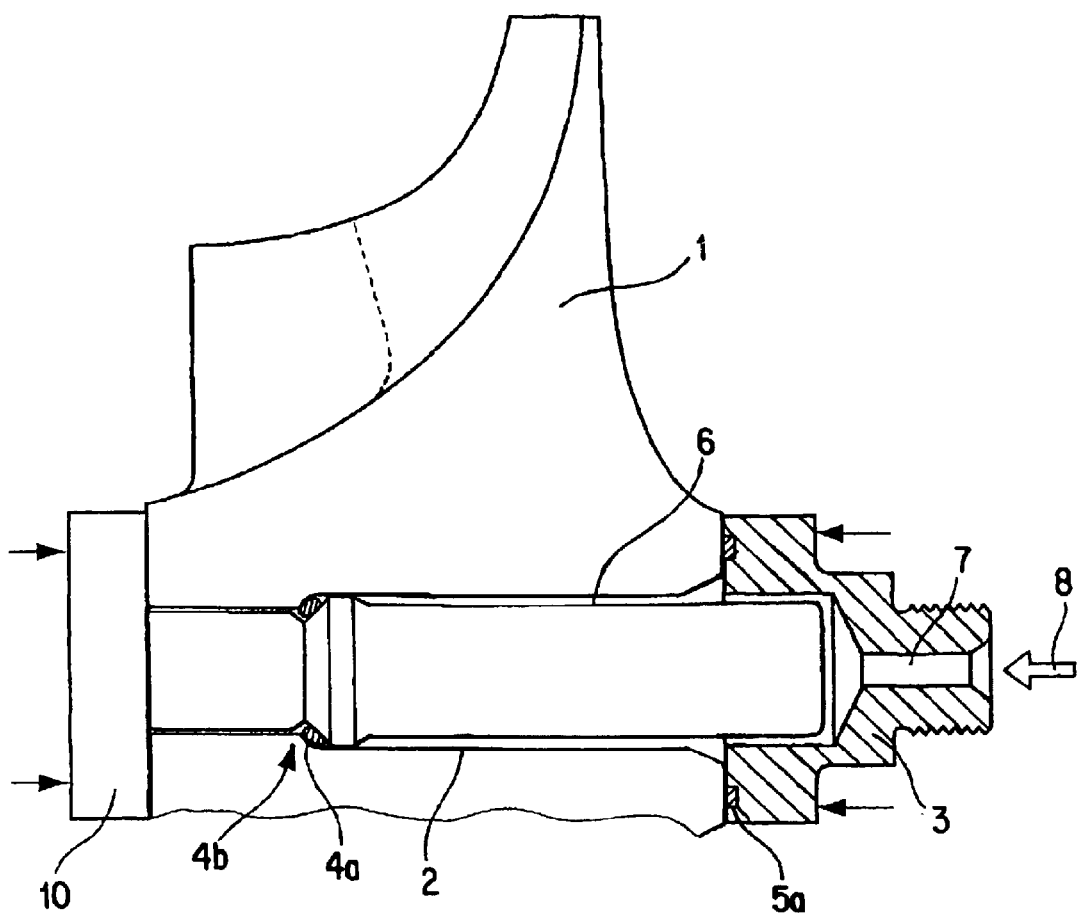
FIG. 2 shows a slightly schematic lateral sectional view of a turbine component in the area of its hub, in the case of which the method according to the invention is applied corresponding to a second embodiment of the invention.

In FIGS. 1 and 2, reference number 1 indicates a turbine component, such as a compressor impeller of a turbine, whose hub bore 2 is to be subjected to a plastic deformation in order to generate prestressing at the hub which is to increase the ceiling speed of the turbine component. Generally, this plastic deformation of the hub bore 2 takes place by its hydraulic expansion by way of a hydraulic fluid 8, which is fed at a high pressure into the hub bore 2 of the turbine component. For this purpose, a hydraulic device 3 in the form of a mandrel is inserted into the hub bore 2, which mandrel forms a recess 6 situated between the hub bore 2 and the hydraulic device 3, which are sealed off by sealing devices on both sides of the above-mentioned recess 6.

In the embodiment illustrated in FIG. 1, sealing devices 4 and 5 are provided on the hydraulic device 3 which press radially from the inside against the hub bore 2. As a result, basically no forces occur in the axial direction of the hub bore 2.

In the embodiment illustrated in FIG. 2, sealing devices 4a and 5a are provided on the hydraulic device 3, which sealing devices 4a and 5a cause a sealing-off in the axial direction; specifically, the sealing device 4a in the axial direction against a shoulder 4b at the distal end of the hub bore 2; the sealing device 5a on the outer surface of the body of the turbine component 1. The resulting forces in the axial direction of the hub bore 2 are absorbed by an abutment 10 which is provided at the distal end of the hydraulic device 3. This generates the forces required for a secure sealing-off in the axial direction at the sealing device 5a.

In FIG. 1 as well as in FIG. 2, the hydraulic fluid 8 is fed into the recess 6 by way of a feeding duct 7 constructed centrally in the hydraulic device 3 and is subjected to a very high pressure so that the hub bore 2 is first stretched and is then subjected to a plastic deformation. As a result, a compressive stress field 9 is generated which is schematically indicated in FIG. 1. This compressive stress field virtually anticipates the tensions occurring at high rotational speeds of the turbine component 1, so that the ceiling speed of the turbine component is increased.

According to an aspect of the invention, the hydraulic expansion of the hub bore 2 takes place during a balancing step during the manufacturing of the turbine component 1, during which the turbine component 1 is mounted on a balancing mandrel which simultaneously forms the hydraulic device 3.

The turbine component 1 may particularly be a compressor impeller of a turbine. In the case of the above-illustrated embodiments, the expansion of the hub bore takes place on a finished turbine component, that is, a turbine component constructed with blade channels. In this case, the turbine component may be a casting or may be forged.

Figure 3:
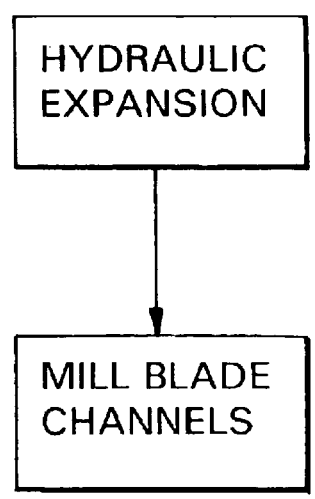
FIG. 3 schematically represents a method of producing a turbine component in which hydraulic expansion of the hub bore takes place before milling of blade channels.

In the case of a turbine component produced from a forged unmachined part, the blade channels are milled. In this case, the hydraulic expansion of the hub bore may take place before the milling of the blade channels (see FIG. 3) or thereafter. If the hydraulic expansion takes place after the milling, as illustrated in FIGS. 1 and 2, this has the advantage that no distortions of the finished part have to be expected and therefore only a slight finishing is required in the hub area. However, lower internal pressure stress can be achieved than in the case of the radial expansion before the milling of the blade channels. The reason is that, in the case of an unmachined part, which consists of a forged round material with a hub bore, higher radial expansion pressures are possible and thus also higher internal pressure stress. However, because of internal-pressure stress surroundings, distortions may occur these, however, are within narrow limits.

What is claimed is:

1. Method of producing a fast-running turbine component with prestressing at a hub thereof adapted to generate a compressive stress field and increase a ceiling speed of the turbine component comprising:

feeding a hydraulic fluid at a high pressure into a hub bore of a solid material to provide plastic deformation and hydraulic expansion of the hub bore, and subsequently milling blade channels in the solid material to produce the turbine component with the prestressing at the hub thereof adapted to generate the compressive stress field and increase the ceiling speed of the turbine component.

2. Method according to claim 1, wherein the hydraulic expansion of the hub bore takes place by way of a hydraulic device which is inserted into the hub bore and which allows a recess provided between the hub bore and the hydraulic device and sealed off toward an outside by sealing devices to be acted upon under pressure by the hydraulic fluid.

3. Method according to claim 2, wherein the sealing devices act in a radial direction between the hydraulic device and the hub bore.

4. Method according to claim 2, wherein the sealing devices act in an axial direction between the hydraulic device and the hub bore.

5. Method according to claim 2, wherein the turbine component is a compressor impeller of a turbine.

6. Method according to claim 1, wherein the turbine component is a compressor impeller of a turbine.

7. Method of producing a fast-running component with prestressing at a hub thereof adapted to generate a compressive stress field and increase a ceiling speed of the component comprising:

feeding a hydraulic fluid at a high pressure into a hub bore of a solid material to provide plastic deformation and hydraulic expansion of the hub bore, and subsequently milling blade channels in the solid material to produce the component with the prestressing at the hub thereof adapted to generate the compressive stress field and increase the ceiling speed of the component.

* * * * *